US011606360B1

(12) United States Patent
Rule et al.

(10) Patent No.: US 11,606,360 B1
(45) Date of Patent: Mar. 14, 2023

(54) SYSTEM AND METHOD FOR MULTI-ACCOUNT PROVISIONING

(71) Applicant: Capital One Services, LLC, McLean, VA (US)

(72) Inventors: Jeffrey Rule, Chevy Chase, MD (US); Lawrence Douglas, McLean, VA (US); Jackson Macomber, Henrico, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/741,001

(22) Filed: May 10, 2022

(51) Int. Cl.
*G06Q 20/32* (2012.01)
*H04L 9/40* (2022.01)

(52) U.S. Cl.
CPC ............ *H04L 63/10* (2013.01); *H04L 63/083* (2013.01)

(58) Field of Classification Search
CPC ..... H04L 63/10; H04L 63/083; G06Q 20/325; G06Q 20/10; G06Q 20/12; G06Q 20/3227; G06Q 20/3278; G06Q 20/382; G06Q 20/3823; G06Q 20/3829; G06Q 20/40; G06Q 20/326
USPC .......................................................... 726/4
See application file for complete search history.

(56) References Cited

U.S. PATENT DOCUMENTS

| | | | |
|---|---|---|---|
| 7,146,159 B1 | 12/2006 | Zhu | |
| 10,346,848 B2 | 6/2019 | Ziat et al. | |
| 10,461,933 B2 | 10/2019 | Le Saint et al. | |
| 10,664,824 B2 | 5/2020 | Wong et al. | |
| 11,087,328 B2 | 8/2021 | Carpenter et al. | |
| 11,201,743 B2 | 12/2021 | Le Saint et al. | |
| 2015/0095219 A1* | 4/2015 | Hurley | G06Q 20/12 705/39 |
| 2016/0218875 A1* | 7/2016 | Le Saint | H04L 9/0825 |
| 2019/0122212 A1 | 4/2019 | Huxham et al. | |
| 2019/0213578 A1 | 7/2019 | Reijkens | |

(Continued)

FOREIGN PATENT DOCUMENTS

WO 2012/126753 8/2012
WO 2013/157797 10/2013

*Primary Examiner* — Jeffrey C Pwu
*Assistant Examiner* — Nega Woldemariam
(74) *Attorney, Agent, or Firm* — Hunton Andrews Kurth LLP

(57) ABSTRACT

In a method for providing provisioning information, a central data processing system receives from a transaction data processing system, an encrypted user datum associated with a client user of the transaction data processing system; receives from at least one of a plurality of account administrator data processing systems, a response comprising a notification that a user account administrated by that account administrator data processing system is associated with the client user; receives an account administrator selection message including identification of a user-selected account administrator from an account administrator list; transmits to the account administrator data processing system associated with the user-selected account administrator, a provisioning request for client user account provisioning information; receives from the account administrator data processing system associated with the user-selected account administrator, the client user account provisioning information; and transmits to the transaction data processing system, the client user account provisioning information.

20 Claims, 9 Drawing Sheets

(56) References Cited

U.S. PATENT DOCUMENTS

2020/0097960 A1    3/2020    Wong et al.
2021/0150616 A1    5/2021    Kentris et al.

\* cited by examiner

| Cardholder Matching (Email/Phone) | Cardholder Eligibility | Cardholder Authentication | Payment and PII Provisioning |
|---|---|---|---|
| Ability for a partner to request a match on email or phone to confirm user is a bank customer.<br><br>Considerations:<br>• Speed of response<br>• Email hashing<br>• Risk score | Ability to define cardholder eligibility and maintain eligibility accuracy in near-real-time.<br><br>Considerations:<br>• Speed of response<br>• Must be constantly refreshed based on LSRP<br>• Bank needs to maintain | Ability for a user to request a PIN from Hub.<br><br>User experience is owned by the merchant/processor, bank is responsible for delivery and validation of the PIN | Hub would standardize the provisioning process so that merchants/processors receive the same payment provisioning for all banks. |

Responsibility

| | | | |
|---|---|---|---|
| Bank: Needs to maintain current list of emails. | Bank: Needs to maintain real time cardholder eligibility. | HUB: Can send SMS OTP message for multiple banks. | Bank: Payment credentials/PII data are stored at bank. |

700

Fig. 7 ns for User Account Provisioning

SYSTEM AND METHOD FOR MULTI-ACCOUNT PROVISIONING

FIELD OF THE INVENTION

This disclosure relates generally to systems and automated methods for user account provisioning and, more particularly, to an automated system and method for provisioning account information of multiple accounts to a transaction data processing system.

BACKGROUND OF THE INVENTION

There are many instances where a user having a primary identification card, transaction card, or other primary account (e.g., a credit card account) wishes to provide data relating to this primary account to administrators and/or processors of other accounts (e.g., a membership or shopping account with a merchant). Card account holders, for example, often have a number of separate accounts administered by various entities (e.g., financial institutions or other service providers). When a card account holder wishes to provide provisioning information for the number of separate accounts to a transaction administrator (e.g., a merchant) or when a transaction administrator wishes to provision the provisioning information for the number of separate accounts, the card account holder or the transaction administrator is required to repeat the same process for each of the number of separate accounts which are generally administrated by different entities or card account administrators (e.g., different banks or financial institutions). The resulting process is not only time-consuming, it also discourages card account holders and merchants from provisioning account information of the card account holders.

SUMMARY OF THE INVENTION

An illustrative aspect of the invention provides a method for providing provisioning information to a transaction data processing system. The method includes: transmitting, by a central data processing system to a plurality of account administrator data processing systems and the transaction data processing system, user datum encryption information; receiving, by the central data processing system from the transaction data processing system, an encrypted user datum associated with a client user of the transaction data processing system; transmitting, by the central data processing system to each of the plurality of account administrator data processing systems, a user account query including the encrypted user datum; receiving, by the central data processing system from at least one of the plurality of account administrator data processing systems, a response comprising a notification that a user account administrated by that account administrator data processing system is associated with the client user; transmitting, by the central data processing system to the transaction data processing system, an account administrator list identifying the at least one of the plurality of account administrator data processing systems; receiving, by the central data processing system from the transaction data processing system, an account administrator selection message including identification of a user-selected account administrator from the account administrator list; transmitting, by the central data processing system to the account administrator data processing system associated with the user-selected account administrator, a provisioning request message including a request for client user account provisioning information; receiving, by the central data processing system from the account administrator data processing system associated with the user-selected account administrator, the client user account provisioning information; and transmitting, by the central data processing system to the transaction data processing system, the client user account provisioning information.

Another aspect of the invention provides an automated system for providing provisioning information to a transaction data processing system. The system comprises a datum encryption data processor configured to: generate user datum encryption information; and transmit the user datum encryption information to a plurality of account administrator data processing systems and the transaction data processing system. The system also comprises a user account identification data processor configured to: receive, over a first network from the transaction data processing system, an encrypted user datum associated with a client user of the transaction data processing system; transmit, over a second network to each of the plurality of account administrator data processing systems, a user account query including the encrypted user datum; receive, over the second network from at least one of the plurality of account administrator data processing systems, a response comprising a notification that a user account administrated by that account administrator data processing system is associated with the client user; transmit, over the first network to the transaction data processing system, an account administrator list identifying the at least one of the plurality of account administrator data processing systems; and receive, over the first network from the transaction data processing system, an account administrator selection message including identification of a user-selected account administrator from the account administrator list. The system further comprises a provisioning information broadcast data processor configured to: transmit, over the second network to the account administrator data processing system associated with the user-selected account administrator, a provisioning request message including a request for client user account provisioning information; receive, over the second network from the account administrator data processing system associated with the user-selected account administrator, the client user account provisioning information; and transmit, over the first network to the transaction data processing system, the client user account provisioning information.

Another aspect of the invention provides a non-transitory, computer readable medium comprising instructions that, when executed on a data processing system, perform actions comprising: transmitting, by a central data processing system to a plurality of account administrator data processing systems and a transaction data processing system, user datum encryption information; receiving, by the central data processing system from the transaction data processing system, an encrypted user datum associated with a client user of the transaction data processing system; transmitting, by the central data processing system to each of the plurality of account administrator data processing systems, a user account query including the encrypted user datum; receiving, by the central data processing system from at least one of the plurality of account administrator data processing systems, a response comprising a notification that a user account administrated by that account administrator data processing system is associated with the client user; transmitting, by the central data processing system to the transaction data processing system, an account administrator list identifying the at least one of the plurality of account administrator data processing systems; receiving, by the central data processing system from the transaction data processing system, an account administrator selection message including identification of a user-selected account administrator from the account administrator list; transmitting, by the central data processing system to the account administrator data processing system associated with the user-selected account administrator, a provisioning request message including a request for client user account provisioning information; receiving, by the central data processing system from the account administrator data processing system associated with the user-selected account administrator, the client user account provisioning information; and transmitting, by the central data processing system to the transaction data processing system, the client user account provisioning information.

BRIEF DESCRIPTION OF THE DRAWINGS

The invention can be more fully understood by reading the following detailed description together with the accompanying drawings, in which like reference indicators are used to designate like elements, and in which:

FIG. 7 is a schematic function diagram of a system for provisioning account information of multiple accounts to a transaction data processing system according to an embodiment of the invention;

DETAILED DESCRIPTION OF THE INVENTION

Figure 1:
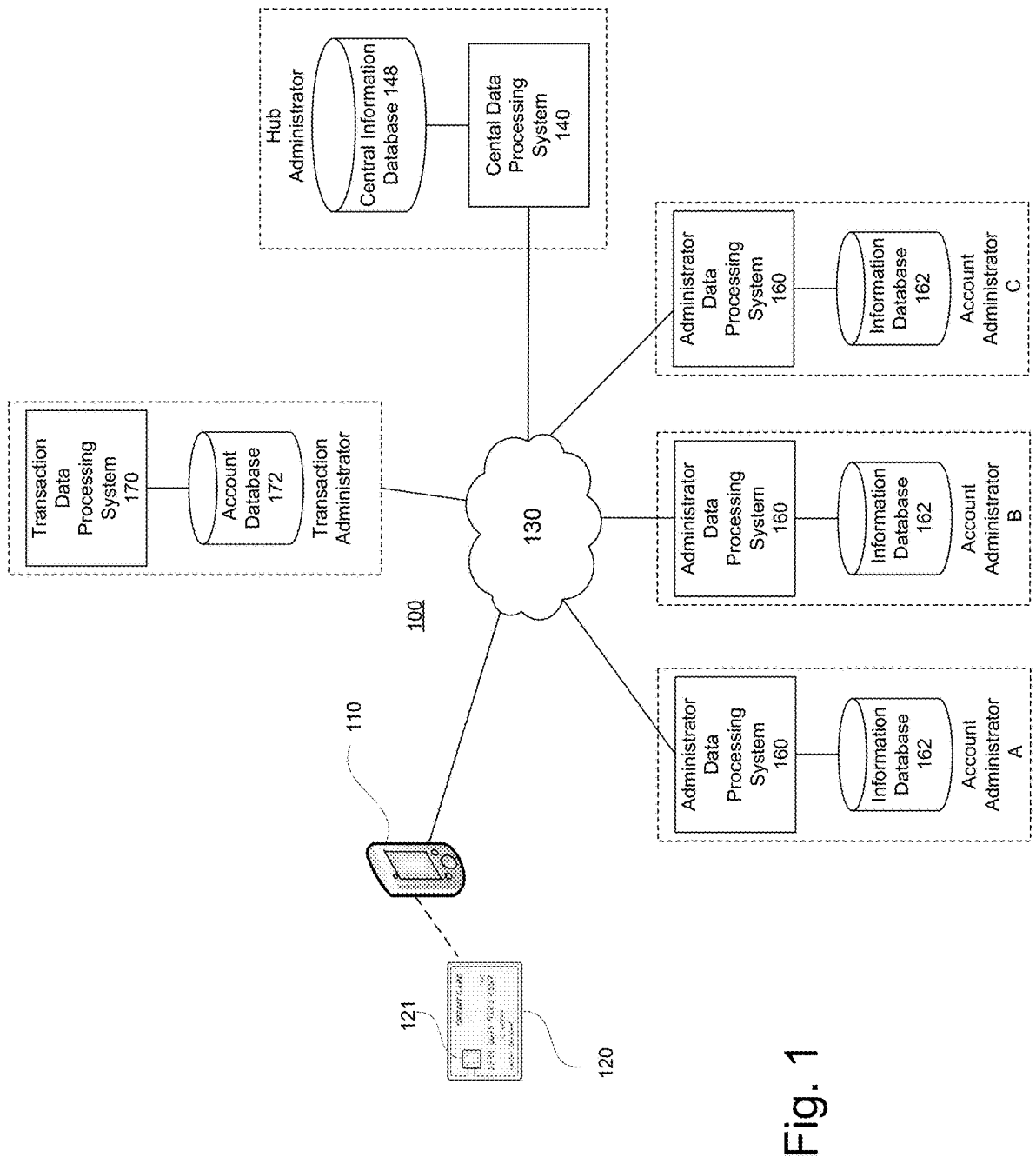
FIG. 1 is a schematic representation of a system for provisioning account information of multiple accounts to a transaction data processing system according to an embodiment of the invention.

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides automated methods by which multiple card account administrators (e.g., a bank or transaction card account administrator) can securely push account provisioning information and user data to a transaction processing entity (e.g., a merchant) without the need for the account holder to switch applications, authenticate or log into each of the multiple card account administrators and without the need for the transaction processing entity to integrate with the multiple card account administrators on a one-by-one base. This is accomplished through the use of a shared encryption and/or hashing algorithm that allows the multiple card account administrators and the transaction processing entity to identify account holders they have in common and establish the basis for secure transmission of primary account provisioning information for a particular primary account holder from the multiple primary account administrators to the transaction processing entity. The present disclosure further uses a central data processing system as a hub to coordinate the multiple card account administrators and the transaction processing entity in a manner that allows an easy integration of the transaction processing entity (e.g., the merchant's website and/or application) with the multiple card account administrators (e.g., banks and/or wallets administrators).

In an example embodiment of the present disclosure, a user may visit a website of a merchant (e.g., a transaction processing entity or administrator). As used herein, a user may refer to a card holder of a credit card, a person authorized by the card holder to use the credit card, a card account holder associated with a credit card, and/or a person authorized by the card account holder. During checkout on the merchant's web site, the user may want an easy access to his/her personal identifiable information (PII) and payment credentials from all his/her banks and wallets. An embodiment of the present disclosure uses a single central "hub" that allows an easy integration with the merchant's website and/or application and connects to all banks and wallets. During the checkout, the merchant's application or website may have the user information embedded that reduces friction during checkout to retrieve the user's PII and payment credentials. The present disclosure can retrieve multiple cards from different banks with a single authentication of the user. The user can add items as usual to his/her shopping cart. During the checkout flow he/she enters the part of the flow where customer mailing information and payment credentials are entered. This part may be an embedded software development kit (SDK) or integration via application programming interface (API) that integrates the "hub." During the checkout flow, the user can first enter his/her personal data, usually email or phone. The email is used to determine if the user uses one or multiple participating banks and wallets. The "hub" requests match for customer email from participating banks and/or wallets. The user can select a single bank or multiple banks he/she would like to use to pay or store those cards on file with the merchant. Before payment and personal identifiable information can be retrieved, the user is required to successfully complete multi-factor authentication (MFA), such as one-time password via Short Message Service (SMS OTP). The user may be shown a list of eligible cards (e.g., last 4 digits only), from multiple banks, and then selects the card(s) he/she wants to provision to the merchant application or website. The system disclosed herein can also select a card that best matches the checkout experience. For example, if the merchant is coded as a "travel" merchant then a card of the user with better travel rewards could be suggested. In this regards, machine learning technologies can also be used at this point to select the card that best matches the checkout experience. The user reviews and consents to the bank/ issuer, thus sharing his/her PII and payment data with the merchant. A full primary account number (PAN) or a merchant specific Virtual Card Number (VCN) can be shared via API with the merchant. The merchant responds with a provisioning status (e.g., successful or unsuccessful) to the issuing bank the card of which has been selected and stored with the merchant.

The present disclosure can be usable for any type of account, but is of particular value for those associated with a smart card (e.g., a chip-provided identification card or transaction card). While not limited to such accounts, the present disclosure may be of particular value in relation to card-based financial accounts. As used herein, the term financial account encompasses any account through which financial transactions may be processed. Financial accounts can include, for example, credit accounts, savings accounts, checking accounts, investment accounts, and the like.

Embodiments of the present disclosure may be best understood with reference to FIG. 1, which illustrates an exemplary account transaction system 100 that encompasses a user device 110, a plurality of account administrator entities A, B, C (e.g., banks) each for a primary account of an account holder associated with the user device 110 and each having an administrator data processing system 160 and an account information database 162, a hub administrator, and a transaction administrator (e.g., a merchant). The hub administrator has a central data processing system 140 and a central information database 148. The transaction administrator has a transaction data processing system 170 and an account information database 172. In the illustrated example, the user device 110, the central data processing system 140, the administrator data processing systems 160, and the transaction data processing system 170 are network-enabled computer systems configured to communicate with each other via a communication network 130. The system 100 may also comprise a transaction card 120 associated with the card holder account that is used for authenticating the user. The transaction card 120 may be any chip-carrying transaction card ("smart" card) having electrical and/or near field or other short range communication capabilities. A typical transaction card 120 that is usable in various embodiments of the present disclosure is a smart card with a microprocessor chip 121. The microprocessor chip 121 includes processing circuitry for storing and processing information, including a microprocessor and a memory. The transaction card 120 may be configured for communication with transaction terminals and other devices via a communication interface configured for establishing communication with transaction processing devices (e.g., the user device 110). The communication interface may be or include an NFC communication interface configured for communication with other NFC communication devices when the card 120 is within a predetermined NFC range. The communication interface and the microprocessor may, in particular, be configured for establishing NFC communication with the user device 110.

As referred to herein, a network-enabled computer system and/or device may include, but is not limited to any computer device, or communications device (or combination of such devices) including, a server, a network appliance, a personal computer (PC), a workstation, a smart card, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be any form of communication network capable of enabling communication between the components, systems, and/or devices of the system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication (GSM), a Personal Communication Service (PCS), a Personal Area Network (PAN), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

In the example embodiments presented herein, an account holder may be any individual or entity having one or more primary accounts with one or more corresponding account administrators (e.g., banks or primary card account processors) and, a secondary account (e.g., a membership account or a shopping account) with a transaction administrator (e.g., merchants or other service providers) or desiring to set up a secondary account with a transaction administrator. The user device 110 may be a mobile device or other processor that an account holder uses to carry out a transaction. An account may be held by any place, location, object, entity, or other mechanism for performing transactions in any form, including, without limitation, electronic form. An account may be a financial account or a non-financial transaction account. In various embodiments, a card-facilitated account may be a credit card account, a prepaid card account, stored value card account, debit card account, check card account, payroll card account, gift card account, prepaid credit card account, charge card account, checking account, rewards account, line of credit account, credit account, mobile device account, or mobile commerce account. In some instances, the account holder may be a transaction processing entity such as a financial institution, credit card provider, or other entity that offers accounts to customers. In some instances the card-facilitated account may a non-financial transaction account, such as a membership account, a loyalty or rewards account, a physical access account, and a transportation account. In some instances, the card-facilitated account may be used as a form of identification.

In some examples, exemplary procedures in accordance with the present disclosure described herein can be performed by a computing and/or processing arrangement (e.g., a computer hardware arrangement). Such computing and/or processing arrangement can be, for example entirely or a part of, or include, but not limited to, a computer and/or processor that can include, for example one or more microprocessors, and use instructions stored on a non-transitory computer-readable medium (e.g., RAM, ROM, hard drive, or other storage device). For example, a computer-readable medium can be part of the memory of the devices illustrated in FIG. 1, or other computing and/or processing arrangement.

In some examples, a computer-readable medium (e.g., as described herein, a storage device such as a hard disk, floppy disk, memory stick, CD-ROM, RAM, ROM, etc., or a combination thereof) can be provided (e.g., in communication with the computing and/or processing arrangement). The computer-readable medium can contain executable instructions thereon. In addition or alternatively, a storage arrangement can be provided separately from the computer-readable medium, which can provide the instructions to the computing and/or processing arrangement so as to configure the computing and/or processing arrangement to execute certain exemplary procedures, processes, and methods, as described herein above, for example.

Figure 2:
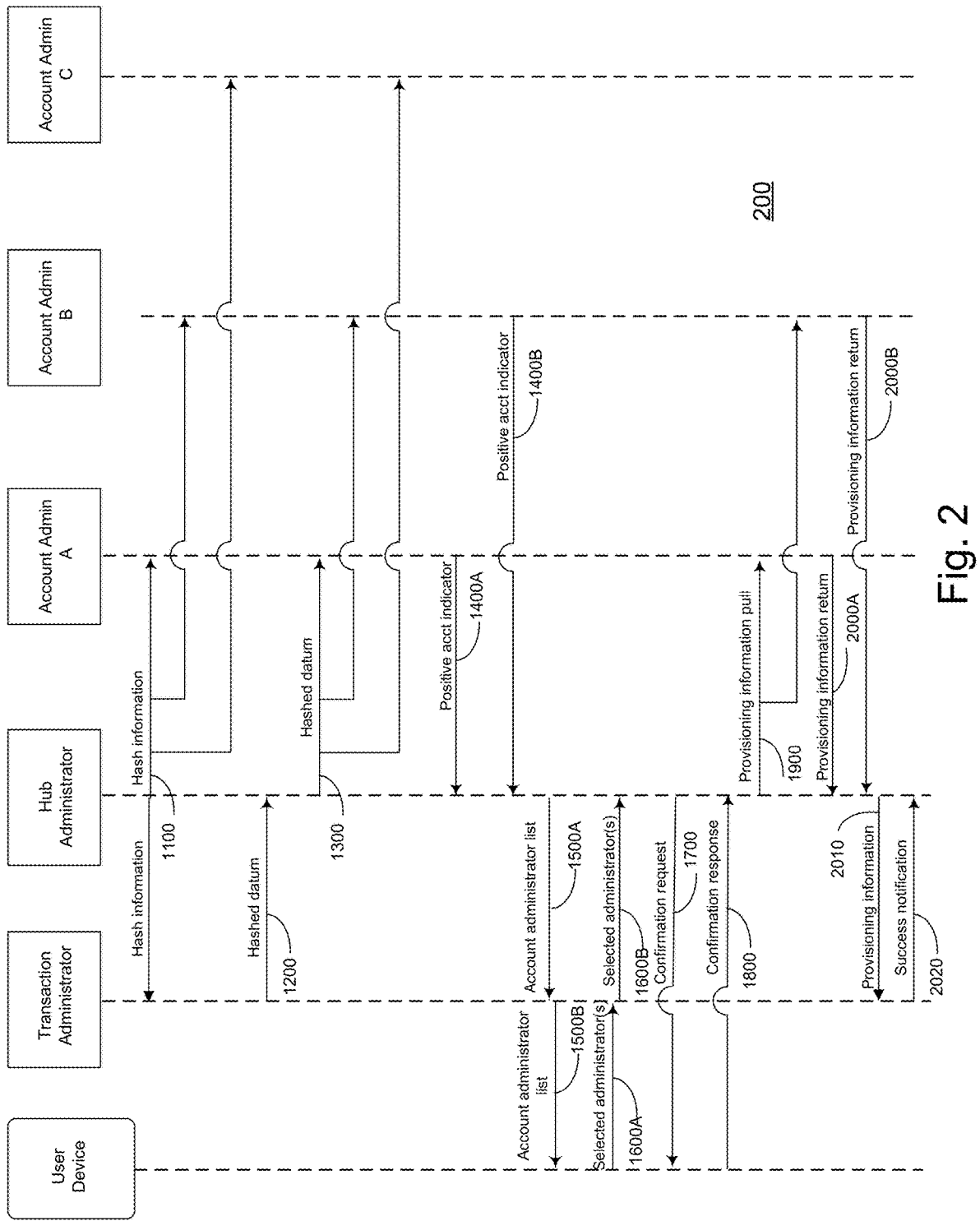
FIG. 2 illustrates a sequence of operations for automatically provisioning account information of multiple accounts to a transaction data processing system according to an embodiment of the invention.

The sequence diagram of FIG. 2 illustrates an exemplary application of embodiments of the present disclosure in conjunction with the system 100 of FIG. 1. In the scenario set forth in FIG. 2, an account holder and/or user associated with a user device (e.g., user device 110) has multiple card accounts with one or more corresponding card account administrators (e.g., account administrator entities A, B, C) and also has a secondary account (e.g., a membership account) or wish to set up a secondary account with a transaction administrator (e.g., a merchant). For example, the user may use the user device to perform some shopping activities on a website or in an shopping application associated with the merchant, and during the checkout process, the user wishes to provision the transaction data processing system (e.g., the transaction data processing system 170) of the transaction administrative entity with information associated with the card holder account from the one or more corresponding card account administrators. Embodiments of the present disclosure provide an automated process by which the one or more corresponding card account administrators can accomplish such provisioning with the partner transaction administrator who also has a secondary account with that account holder or with who the user wishes to set up a secondary account for future activities. As part of this process and as shown in FIG. 2, the hub administrator, at 1100, securely transmits through its central data processing system (e.g., the central data processing system 140) to its partner transaction administrator and the plurality of card account administrators unique hash and/or encryption information that can be used to encrypt a predetermined piece of account holder information that is unique to the account holder and would typically be available to all of the card account administrators. This piece of account holder information (sometimes referred to herein as an account holder datum or user datum) may be, for example, a telephone number, email address, driver's license number, social security number, or employee number. The encryption information may be, for example, a unique algorithm and/or encryption key values usable to create a hash of a standardized format version of the account holder datum. At the time the hub administrator transmits the hash information to the plurality of card account administrators and the transaction administrator, it may also specify the particular account holder datum to be used and the format it should be in prior to hashing. Once the hash information is received, the transaction administrator and each of the plurality of card account administrators can then use it to generate a hashed datum for each of its own account holders, which it then stores in it account holder information database.

In some embodiments, the hub administrator may not transmit the hash information to the transaction administrator. In this scenario, the hub administrator may receive non-hashed or non-encrypted user datum from the transaction administrator, and then hash or encrypt the received non-hashed or non-encrypted user datum using the unique hash and/or encryption information and transmit the hashed or encrypted user datum to each of the plurality of card account administrators.

In the scenario of FIG. 2, the hub administrator receives from the user and/or card account holder a provisioning request through the transaction administrator at 1200. The provision request includes a hashed user datum, such as a hashed email address of the user that is either entered by the user or already stored with the transaction administrator. This may typically be accomplished using a shopping application or website associated with the transaction administrator and displayed on the account holder's user device. The request and hashed user datum are received by the hub administrator's data processing system. In response, the hub administrator transmits the hashed user datum and, at 1300, to all of the account administrators. Each of the account administrators may then compare the hashed user datum to each hashed account holder datum in its account information database to determine if the card account holder has an account with that administrator. In the scenario illustrated in FIG. 2, account administrators A and B each find that they have a matching hashed user datum and, thus, have an account for the card account holder. Accordingly, at 1400A and 1400B, account administrators A and B transmit a response to the hub administrator that includes a positive account indicator. Account administrator C fails to find a matching hashed datum, and thus, does not transmit a response. It will be understood that, in some embodiments, account administrator C could still send a response, but with a negative account indicator.

The hashed user datum approach described above allows the card account administrators and the transaction administrator to determine if they have a particular account holder in common without having to share any account holder information. Thus, no usable account holder information is shared with the transaction administrator who do not have an account with the account holder or with whom the account holder does not wish to set up a secondary account, thereby enhancing data security and preventing frauds.

Having received positive account indicators from at least some of the card account administrators, the hub administrator may assemble an account administrator list including the card account administrators who provided positive account indicators, and at 1500A of the exemplary sequence of FIG. 2, the hub administrator transmits the account administrator list to the transaction administrator who may then, at 1500B, transmits the account administrator list to the user device. At 1600A, the user may then select one or more card account administrators from the account administrator list, and transmits through the user device the selected card account administrators to the transaction administrator. The transaction administrator, at 1600B, transmits the selected card account administrators to the hub administrator. The account administrator list is displayed on the user device for the user to choose from, and the selected card account administrators are the card account administrators of which the provision information the account holder wishes to provision to the transaction administrator. In some embodiments, the positive account indicator the hub administrator received from the card account administrators may include an authentication credential, such as a one-time password (OTP), and the hub administrator can authenticate the user based on the authentication credential by, for example, forwarding the OTP to the user device.

At 1700, the hub administrator transmits a confirmation request to the user device. The confirmation request may include a request that the account holder verify that he/she wishes to send provisioning information of accounts associated with the selected card account administrators to the transaction administrator. In addition or instead, the confirmation request may require that the account holder provide authorization confirmation information. This may be or include any suitable information usable by the card account administrator to confirm that the user of the user device is the account holder and/or is authorized to make the provisioning request. At 1800, the user device transmits a confirmation response to the hub administrator, which uses the information in the response to establish which, if any, of the card account administrators is to provide provisioning information and/or verify authorization of the user device and user to request provisioning of the transaction administrator. In the exemplary scenario, the hub administrator determines that card account administrators A and B should provide provisioning information. At 1900, the hub administrator pulls or requests the provisioning information from the card account administrators A and B and at 2000A and 2000B, receives the corresponding provisioning information from the card account administrators A and B. The actual provisioning information may be any information associated with the card holder account that would be usable by the transaction administrator to draw an association between their own accounts for the card account holder and the card holder account. In many cases, the provisioning information may include a card identifier that can be used to facilitate a transaction and associate it with the card holder account. The provisioning information can be used by the transaction administrator to update its own account of the user that already exists or to set up a new account of the user with the transaction administrator. The provisioning information may include provisioning information of one or more card accounts of the card holder associated with the one or more card account administrators.

At 2010, the hub administrator transmits the pulled provisioning information to the transaction administrator, and at 2020, the transaction administrator transmits a notification to the hub administrator indicating that the account provisioning was successfully completed. This may be accomplished, for example, through an API call back. Further, the hub may transmit the success notification to the user device to notify the user of the successful provision on the transaction administrator.

It will be understood that while FIGS. 1 and 2 illustrate three card account administrators and one transaction administrator, the present disclosure is not limited to any particular number of card account administrators and/or transaction administrator. The methods and systems of the present disclosure may be used with as many card account and transaction administrator entities as are willing to partner with one another. Indeed, the value of the present disclosure increases with the number of partner administrators involved.

Figure 3:
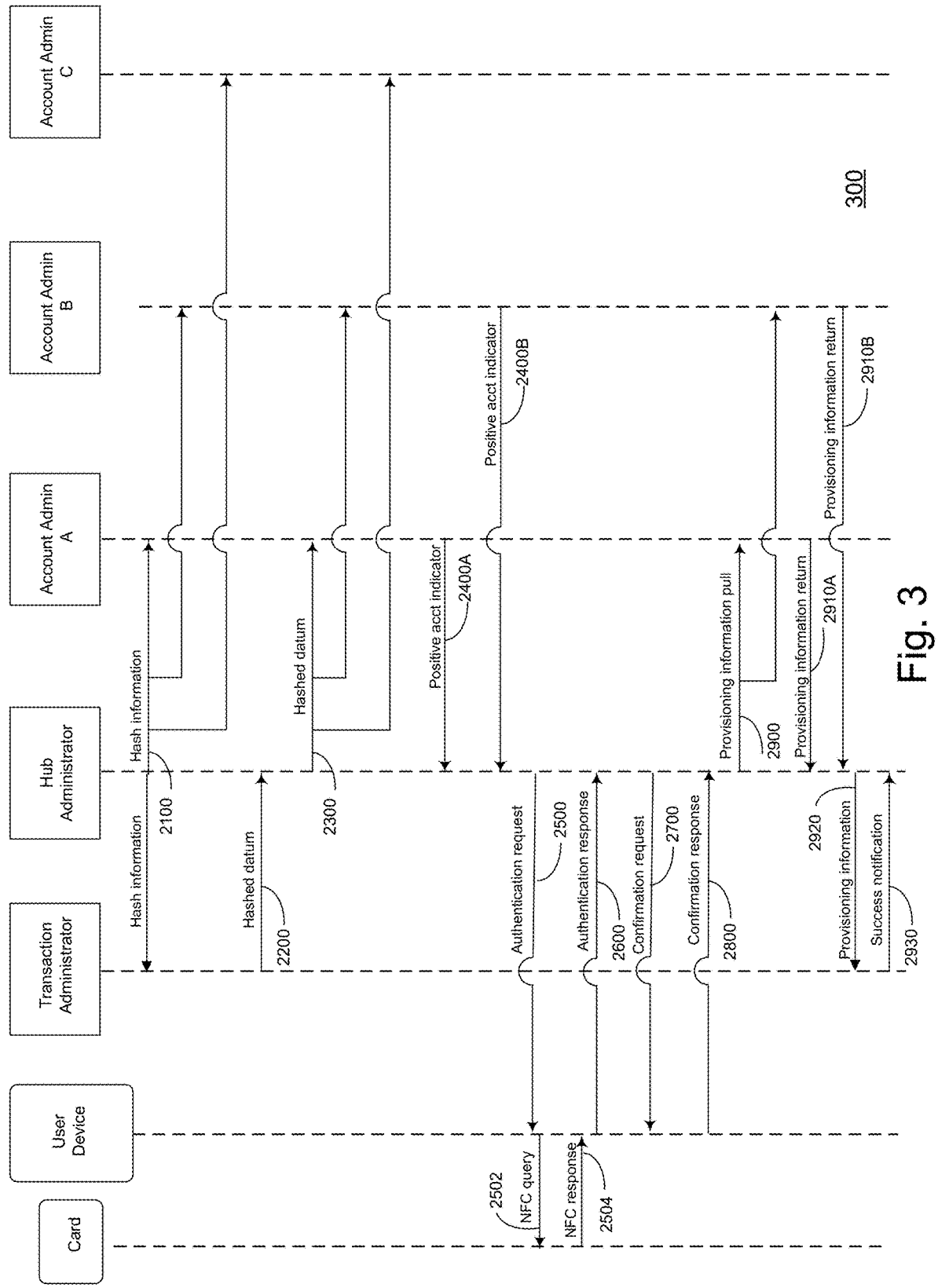
FIG. 3 illustrates a sequence of operations for automatically provisioning account information of multiple accounts to a transaction data processing system according to an embodiment of the invention.

An exemplary variation on the scenario of FIG. 2 is shown in the sequence diagram of FIG. 3. In this variation, the method requires the presence of the card associated with the account in order for the account holder's request to be carried out. In the illustrated sequence, the hub administrator has already shared the user datum hashing information with the card account administrators and the partner transaction administrator at 2100. As in the previous example, the card account holder uses the user device to send a provisioning request including a hashed user datum through the transaction administrator to the hub administrator at 2200. In response, the hub administrator transmits the hashed user datum and, at 2300, to all of the account administrators. Each of the account administrators may then compare the hashed user datum to each hashed account holder datum in its account information database to determine if the card account holder has an account with that administrator. In the scenario illustrated in FIG. 3, account administrators A and B each find that they have a matching hashed user datum and, thus, have an account for the card account holder. Accordingly, at 2400A and 2400B, account administrators A and B transmit a response to the hub administrator that includes a positive account indicator. Account administrator C fails to find a matching hashed datum, and thus, does not transmit a response. It will be understood that, in some embodiments, account administrator C could still send a response, but with a negative account indicator. The positive account indicator may include information on a user device associated with the card account holder and also may include one or more authentication credentials (e.g., information about a transaction card) that may be encrypted.

At 2500, the hub administrator transmits an authentication request to the user device. In the illustrated scenario, this requires that communication be established between the user device and a transaction card (e.g., the card 120 include a chip 121 in FIG. 1). In typical embodiments, this communication is established through near field communication (NFC). Thus, at 2502, the user device transmits an NFC prompt and/or query to the transaction card. In response, the transaction card transmits, at 2504, to the user device NFC response information usable by the hub administrator to verify its presence based on the one or more authentication credentials included in the positive account indicator (e.g., by comparing the one or more authentication credentials with the NFC response information). The NFC response information may be or include, for example, security information encrypted by the transaction card using a private key unique to the card that is known only to the card account administrator. At 2600, the user device transmits an authentication response including the NFC response information back to the hub administrator, where the hub administrator can authenticate the user based on the one or more authentication credentials included in the positive account indicator and the NFC response information.

At 2700, the hub administrator transmits a confirmation request to the user device. The confirmation request may include a card account administrator list from which the user can select one or more card account administrator, and a request that the account holder verify that he/she wishes to send provisioning information of accounts associated with the selected card account administrators to the transaction administrator. At 2800, the user device transmits a confirmation response to the hub administrator, which uses the information in the confirmation response to establish which, if any, of the card account administrators is to provide provisioning information. In the exemplary scenario, the hub administrator determines that card account administrators A and B should provide provisioning information. At 2900, the hub administrator pulls or requests the provisioning information from the card account administrators A and B and at 2910A and 2910B, receives the corresponding provisioning information from the card account administrators A and B. The actual provisioning information may be any information associated with the card holder account that would be usable by the transaction administrator to draw an association between their own accounts for the card account holder and the card holder account. In many cases, the provisioning information may include a card identifier that can be used to facilitate a transaction and associate it with the card holder account. The provisioning information can be used by the transaction administrator to update its own account of the user that already exists or to set up a new account of the user with the transaction administrator. The provisioning information may include provisioning information of one or more card accounts of the card holder associated with the one or more card account administrators.

At 2920, the hub administrator transmits the pulled provisioning information to the transaction administrator, and at 2930, the transaction administrator transmits a notification to the hub administrator indicating that the account provisioning was successfully completed. This may be accomplished, for example, through an API call back. Further, the hub may transmit the success notification to the user device to notify the user of the successful provision on the transaction administrator.

Details of system components usable in embodiments of the present disclosure and, in particular, the system 100 will now be described.

Figure 4:
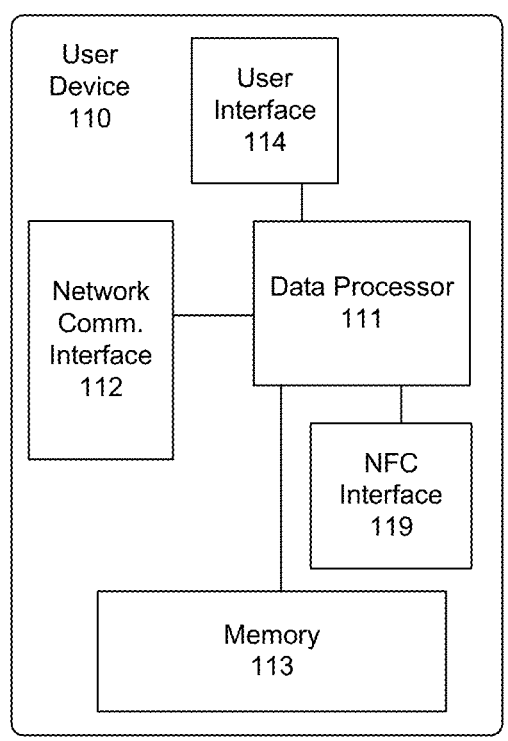
FIG. 4 is a schematic representation of a user processing device usable in embodiments of the invention.

With reference to FIG. 4, the user device 110 may be any computer device or communications device including a server, a network appliance, a personal computer (PC), a workstation, and a mobile interface device such as a smart phone, smart pad, handheld PC, or personal digital assistant (PDA). In a particular embodiment illustrated in FIG. 4, the user device 110 includes an on-board data processor 111 in communication with a memory 113, a user interface 114, and a network communication interface 112. The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 112 is configured to establish and support wired and/or wireless data communication capability for connecting the device 110 to the network 130 or other communication network. The network communication interface 112 can also be configured to support communication with a short-range wireless communication interface, such as Bluetooth.

In some embodiments, the user device 110 may include an NFC interface 119 configured for establishing NFC communication with other NFC-equipped devices. In some of these embodiments, the NFC interface 119 may be or include an NFC receiver configured for selectively activating a magnetic field for use in establishing near field communication with an NFC transmitter. The NFC interface 119 is configured for establishing NFC communication when a passive NFC tag or other NFC-enabled device is brought into the magnetic field and within NFC communication range of the user device 110. The NFC interface 119 is configured, in particular, for communication with an NFC-enabled smart transaction card 120 when the card 120 is brought within communication range of the user device 110.

In embodiments of the present disclosure, the memory 113 may have stored therein one or more applications usable by the data processor 111 to conduct and/or monitor transactions between the user device 110 and transaction processing devices or systems over the network 130. These applications may include instructions usable by the data processor 111 to identify transaction events, store event data in the memory 113, and communicate event data to the central data processing system140, one or more of the administrator data processing systems 160, and/or the transaction data processing system170.

In particular embodiments, the memory 113 may include a card account application configured for carrying out transactions on a card account associated with an account holder user of the user device 110. The application may, in particular, be configured for carrying out interactive communications/transactions with one or more of the administrator data processing system 160 and, in some embodiments, the central data processing system140, and the transaction data processing systems 170. The application instructions may be configured for receiving, from the account holder via the user interface 114, login information for establishing authenticatable communication with one or more of the administrator data processing system 160, the central data processing system140, and/or the transaction data processing systems 170. The login information may include an account identifier or other user identification and user authentication information.

Among other functions, the card account application may include instructions for implementing a provisioning function, the result of which is the pushing of card account provisioning information from the central data processing system140 to the transaction data processing systems 170 of transaction administrator with whom the card account holder has a separately managed account or wishes to set up a separately managed account. These instructions may include instructions for the data processor 111 to receive from a user via the user interface a direction to transmit, via the network communication interface 112 and the network 130, a provisioning request to the central data processing system 140 while the user and/or account holder is checking out for shopping on a website of the transaction administrator, for example. The provisioning request may include information identifying the user device, the account holder, an account identifier, and/or a card identifier for a transaction card associated with the account. In some embodiments, the request may identify one or more specific card administrators from which the user wishes to pull the provisioning information and/or the transaction administrator to which the user wishes to provision the provisioning information. The application may include further instructions to receive a confirmation request from the central data processing system 140 over the network 130. The confirmation request may include a request that the user confirm that the user wishes to push card account information to the transaction administrator. In such embodiments, the application is configured to display the request on the user interface and receive a response from the user. In some embodiments, the request may identify the card administrators that have indicated they have an account for the user. In such embodiments, the request may give the user the opportunity to select a subset of the identified card administrators from which the user wishes to pull card account information.

In some embodiments, the confirmation request may also include a request for authentication information that can be used by the central data processing system 140 to verify authorization of the user and/or the user device to make and confirm the provisioning request. Authentication information may include an account identifier or other user identification and user authentication information. The user authentication information may include at least one authentication credential such as a password or a scanned biometric characteristic. In some embodiments, an authentication credential may be or include information encrypted using an encryption key associated with the card account and the account holder or the user device 110.

In particular embodiments, the confirmation request may require authentication information that is or includes card verification information that must be obtained from a smart card 120 associated with the card holder account. In such embodiments, the user device application may be configured to display an instruction for the user to place the card 120 within NFC communication range of the user device 110. The application may be further configured to cause the data processor 111 to transmit, via the NFC interface 119, an authorization query to the card 120 and to receive a query response from the card 120. In some embodiments, the card may be configured to automatically transmit verification information upon being brought within NFC communication range. In such embodiments, an explicit query by the user device 110 to the card 120 may be unnecessary.

The user device application may be further configured to instruct the data processor 111 to construct a confirmation response including confirmation and/or authentication/verification information and to transmit the response to the central data processing system 140 via the network communication interface 112 and the network 130. The application may also be configured to receive and display a provisioning completion message from the central data processing system 140.

The transaction card 120 may be any chip-carrying transaction card ("smart" card) having electrical and/or near field or other short range communication capabilities. A typical transaction card 120 that is usable in various embodiments of the present disclosure is a smart card with a microprocessor chip 121. The microprocessor chip 121 includes processing circuitry for storing and processing information, including a microprocessor and a memory. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The transaction card 120 may be configured for communication with transaction terminals and other devices via a communication interface configured for establishing communication with transaction processing devices. The communication interface may be configured for contact-based communication, in which case the interface may have electrical circuitry and contact pads on the surface of the card 120 for establishing direct electrical communication between the microprocessor and the processing circuitry of a transaction terminal. Alternatively or in addition, the communication interface may be configured for contactless communication with a transaction terminal or other wireless device. In such embodiments, the communication interface may be or include an NFC communication interface configured for communication with other NFC communication devices when the card 120 is within a predetermined NFC range. The communication interface and the microprocessor may, in particular, be configured for establishing NFC communication with the user device 110. In some embodiments, the microprocessor chip 121 may include a second communication interface configured for establishing short range communication with the user device 110 via Bluetooth, or other short range communication methodology. In such embodiments, the transaction card 120 may have a short range communication antenna that is included in or connected to the short range communication interface. The microprocessor chip 121 may also include a power management system for use in managing the distribution of power during an NFC transaction.

The memory may be a read-only memory, write-once read-multiple memory or read/write memory, e.g., RAM, ROM, and EEPROM, and the chip 121 may include one or more of these memories. The memory may have stored therein information associated with a transaction card account. In some embodiments, the memory may have permanently stored therein a unique alphanumeric identifier associated with the account. It may also have stored public and private card encryption keys. In some embodiments, the private and public encryption keys may be permanently hard-wired into the card memory.

The card memory may be configured to store one or more software applications for execution by the microprocessor. In various embodiments, the memory may have stored therein instructions for generating encrypted information and transmitting it to a receiving device (e.g., the user device 110). Such encrypted information may be or include an encrypted verification block or signature that may be used to authenticate and verify the presence of the transaction card 120 during transaction processing. In some embodiments, encrypted information be unique to a particular communication (e.g., a particular NFC transmission by the transaction card).

The administrator data processing systems 160 are network-enabled data processing systems that are each configured for management and control of account-related transactions for a plurality of user accounts. Each administrator data processing system 160 may be configured for communication with the user devices 110 and the central data processing system 140 of the hub administrator via the network 130 for establishing interactive communication sessions with account holders. The administrator data processing systems 160 may also be configured for communication with other entities via the network including the transaction data processing system 170. The administrator data processing systems 160 may be configured, in particular, to receive hashing information from the central data processing system 140 and to use this information to encrypt a standard, formatted account holder datum for each account holder of their respective administrator entities. The hashed datum for each account holder may then be stored with other account holder information in an account information database 162. Each administrator data processing system 160 may also be configured to receive a subsequent user account query from the central data processing system 140 via the network 130. The user account query may include an encrypted card holder account datum, which the administrator data processing system 160 can compare to the stored datum for each of its account holders. Upon finding a hashed account holder datum that matches the hashed card holder datum, the administrator data processing system 160 may transmit to the central data processing system 140 a positive query response indicating that the associated card account administrator has an account for the card holder.

The account information in the account information database 162 may include information on the account holder as well as information on accounts with other administrators. Account holder information may include card information (e.g., card number, expiration date, card holder name, etc.), contact information (mailing address, email address, phone numbers, etc.) and user preferences. The administrator data processing systems 160 may be configured to push primary account provisioning information for an account holder to the transaction data processing system 170 through the central data processing system 140.

In some of these embodiments, the user account administered by the account administrator is a contactless transaction card account, and the account provisioning information includes contactless card account information for use in carrying out merchant account holder transactions processed by the transaction data processing systems 170. The above description of the administrator data processing systems 160 can also be applied to the transaction data processing system 170, therefore for brevity, the description of the transaction data processing system 170 and the account database 172 of the transaction administrator is omitted herein.

Figure 5:
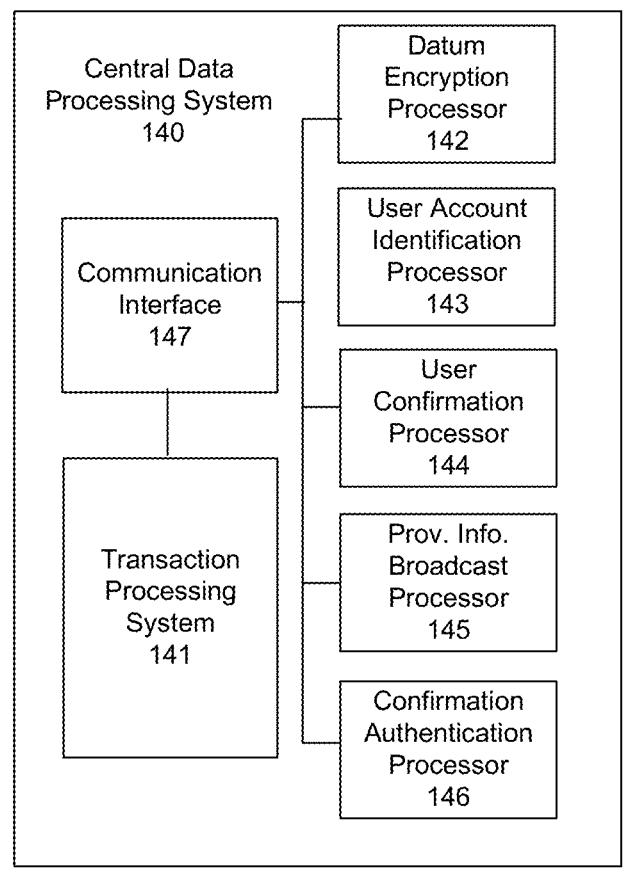
FIG. 5 is a schematic representation of a central data processing system according to an embodiment of the invention.

With reference to FIG. 5, the central data processing system 140 may include a communication interface 147 configured for establishing communication with one or more networks including the network 130, and, via the one or more networks, the user device 110, one or more account administrator data processing systems 160, and the transaction data processing system 170. The central data processing system 140 includes a transaction processing system 141 configured to communicate with the user device 110 and with other processing systems via the network 130 and the network interface 147. The transaction processing system 141 may be configured for receiving and processing card account and transaction information, such as provisioning information and authentication credentials.

The central data processing system 140 may further include a datum encryption processor 142, a user account identification processor 143, a user confirmation processor 144, and a provisioning information broadcast processor 145. In some embodiments, the central data processing system 140 may also include a confirmation authentication processor 146. Any or all of these processors may be configured to communicate over the network 130 via the communication interface 147.

The datum encryption processor 142 may be configured to generate user datum encryption information adapted for encrypting a particular card account holder datum. The card account holder datum may be a typical piece of account holder information that is unique to the card account holder and would typically be known or available to any account administrator with whom the card account holder may have an account. The card account holder datum could be, for example, a telephone number, email address, driver's license number, or employee number. The encryption information may be, for example, a unique algorithm and/or values usable to create a hash of a standardized format version of the card account holder datum. The datum encryption processor 142 may also be configured to transmit, via the network 130, the user datum encryption information to any or all of a plurality of account administrator data processing systems 160 managed by account administrator entities (e.g., banks) and the transaction data processing system 170 of the transaction administrator that have agreed to partner with the hub administrator. At the time the datum encryption processor 142 transmits the encryption information to the account administrator data processing systems 160 and the transaction data processing system 170, it may also specify the particular account holder datum to be used and the format it should be in prior to encrypting.

The user account identification data processor 143 may be configured to receive, over a first network (e.g., network 130) from a user device 110 (through the transaction administrator) associated with a card account holder having an account with the card account administrator, a request to share account provisioning information. The provisioning request may include information identifying the user device, the account holder, an account identifier, and/or a card identifier for a transaction card associated with the account. In some embodiments, the request may identify one or more specific card account administrators that the user wishes to include in the provisioning action. The provisioning information may be or include any information associated with the card holder account that would be usable by the transaction administrators to draw an association between their own accounts for the card account holder and the card holder account. In particular embodiments, the provisioning information may include a card identifier or card account identifier that can be used to facilitate a transaction and associate it with the card holder account. In some embodiments, the request may include limitations on the provisioning information to be shared. The user account identification data processor 143 may be further configured to encrypt a user datum associated with the account holder using the user datum encryption information. The user datum would be drawn from the account holder information stored in the central information database 148 or may be received from the user device 110 or the transaction data processing system 170. It would be selected and formatted so as to match the datum specifications provided to the card administrator data processing systems 160.

The user account identification data processor 143 may be further configured to transmit, over a second network (which may be the same as the first network) to each of the partner account data processing systems 160, a user account query including the encrypted user datum. The processor 143 may also be configured to receive, over the second network, responses from any or all of the partner account data processing systems 160. In some embodiments, each response may include an indication that the account administrator associated with the responding processing system 160 has or does not have its own account for the card account holder. In other embodiments, responses are only received from account data processing systems 160 associated with card administrators that have accounts with the card account holder. The user identification processor 143 may be configured to determine from the query responses a subset of the partner account data processing systems 160 that have accounts for the card holder.

The user confirmation data processor 144 may be configured to transmit to the user device 110 over the first network, a message including a request for confirmation that the account provisioning information should be shared. The message may include identification of the members of the subset of account data processing systems 160 (and/or their associated administrator entities) identified by the user account identification processor 143. The request may include a card administrator list assembly by the user confirmation data processor 144, from which the user may select the members of the subset of account data processing systems 160 (and/or their associated administrator entities). The user confirmation data processor 144 may be further configured to receive from the user device, a confirmation response. This response may include permission to share account provisioning information. In some embodiments, the response may indicate that provisioning information should be shared from only certain of the subset of account data processing systems 160.

The provisioning information broadcast data processor 145 may be configured to retrieve card account provisioning information for the card holder from approved one or more of the account data processing systems 160 for transmission to the transaction data processing system 170. Typical account holder provisioning information could include name, email address, physical address, phone number, employer, social security number or other unique identifier, etc. In some embodiments, the provisioning information may be assembled into a single standard format for all of the different card account administrators. In other embodiments, the format may be tailored to each transaction administrator to meet requirements of that transaction administrator's data processing system 170 and/or account database 172. The provisioning information broadcast data processor 145 may also be configured to transmit, over the second network, the account provisioning information to the transaction administrator's data processing system 170.

As noted above, the central data processing system 140 may also include a confirmation authentication processor 146. The confirmation authentication processor 146 may be a separate processor as illustrated in FIG. 5. Alternatively, the functions of the confirmation authentication processor 146 may be combined with those of the user confirmation processor 144. The confirmation authentication data processor 146 may be configured to receive authentication credentials from one or more of the administrator data processing systems 160 for authenticating the user and/or the user device, such as SMS OTP. The confirmation authentication data processor 146 may be configured to transmit a confirmation authentication request to the user device 110 or the transaction administrator's data processing system 170 over the first network. In some embodiments, this request may be combined with the confirmation request. In other embodiments, the confirmation authentication request may be transmitted in response to the user confirmation data processor 144 receiving a confirmation response including permission to share account provisioning information.

The confirmation authentication request may include a request for authentication information that can be used by the confirmation authentication processor 146 to verify authorization of the user and/or the user device 110 to make and confirm the provisioning request. Authentication information may include an account identifier or other user identification and user authentication information. Authentication information may include an account identifier or other user identification and user authentication information. The user authentication information may include at least one authentication credential such as a password, a SMS OTP or a scanned biometric characteristic that may be used as part of a multi-factor authentication methodology. In some embodiments, an authentication credential may be or include information encrypted using an encryption key associated with the card account and the account holder or the user device 110. In particular embodiments, the confirmation request may require an authentication credential that is or includes card verification information that must be obtained from a smart card 120 associated with the card holder account.

The confirmation authentication processor 146 may be configured to receive authentication information from the user device 110 and/or the transaction data processing system 170 over the first network. The confirmation authentication processor 146 may then use authentication credentials from the authentication information and information from the authentication credentials received from the administrator data processing systems 160 to authenticate the confirmation response. This may be accomplished using any of various known authentication processes associated with particular credentials. In embodiments where encrypted card verification information is received, the authentication processor 146 may be configured to retrieve encryption information from the account information database 162 and use it to decrypt the card-encrypted information. Successful decryption may be used as a positive indication that the provisioning requester is in possession of the transaction card 120 for the card account.

It will be understood that, in embodiments having a confirmation authentication processor 146, the provisioning information broadcast data processor 145 may be configured to transmit account provisioning information only after the confirmation authentication processor has established a positive authentication for the user, user device, and/or confirmation response. It is also noted that the datum encryption processor 142, the user account identification processor 143, the user confirmation processor 144, the provisioning information broadcast processor 145, and the confirmation authentication processor 146 may be merged into one or more processors that can perform the same or similar functions as those above separate processors.

Figure 6:
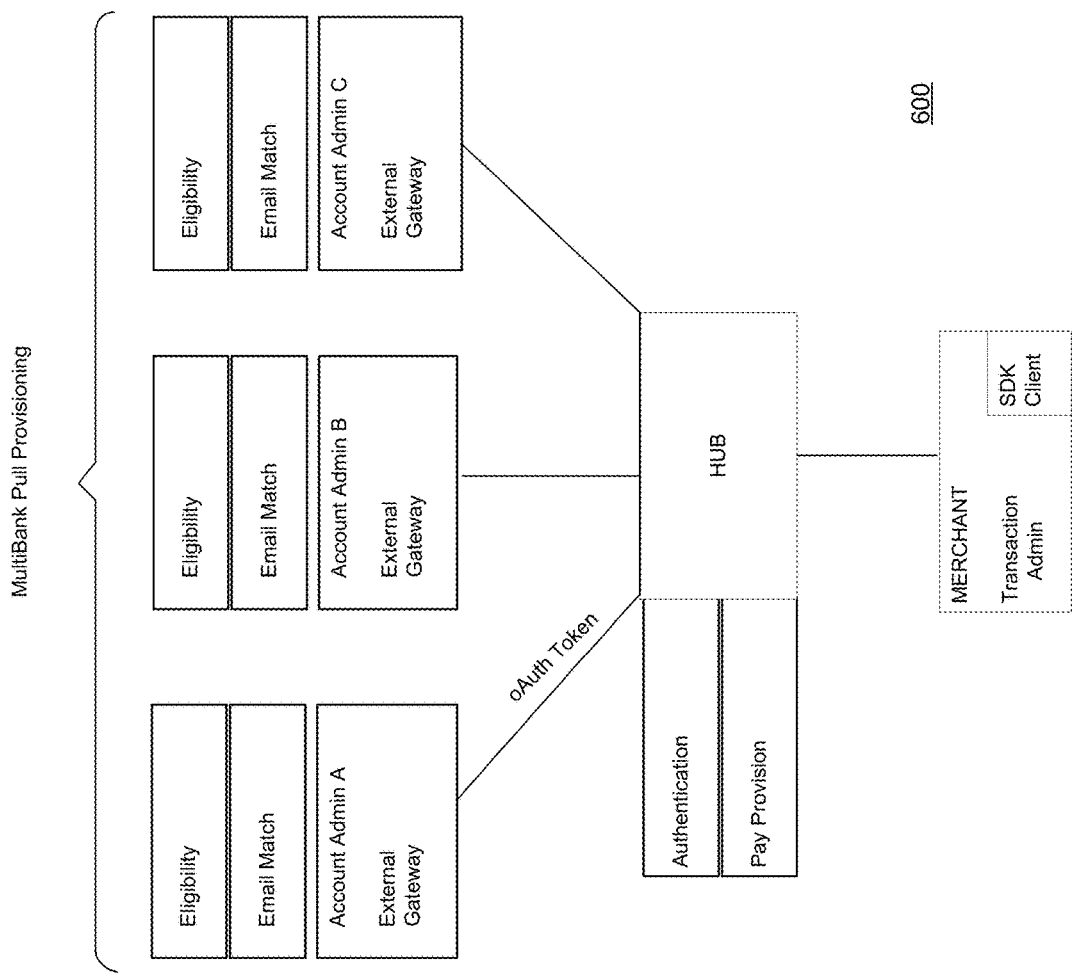
FIG. 6 is a schematic function diagram of a system for provisioning account information of multiple accounts to a transaction data processing system according to an embodiment of the invention.

FIG. 6 illustrates a schematic function diagram 600 of a system for provisioning account information of multiple accounts to a transaction data processing system according to an embodiment of the present disclosure. As shown in FIG. 6, the present disclosure can allow multiple banks (e.g., account admin A, account admin B, and account admin C) to participate by introducing a routing hub that can authenticate and talk to multiple banks on the backend. The hub includes a central data processing system, and is a centralized and single point of integration for merchant. It connects multiple banks, wallets, and/or payment methods and allows a customer/user an easy access to the multiple banks, wallets, and/or payment methods all during checkout with the merchant. In the diagram 600, this example system includes 5 entities: account admin A, account admin B, account admin C, a hub, and a merchant. The hub can provide a single point of integration for the merchant(s) and hub that connects to the individual banks (account admin A, account admin B, and account admin C). The hub can be configured to authenticate the user/customer through the multiple banks, which can allow for the user to request a personal identification number (PIN) from the hub, such SMS OTP. The hub is also configured to receive/retrieve the pay provisioning information for different card accounts of the user from corresponding banks, and transmit the pay provisioning information to the merchant. The merchant is a transaction administrator that may include a transaction data processing system. The merchant may have a SDK client imbedded in its transaction data processing system. User experience is owned by the merchant. Each bank and/or account administrator may include an external gateway through which the hub is connected with that bank. Each bank and the hub may perform the oAuth token protocol for authorization and/or authentication. Each bank performs user and/or card holder matching, which allows the merchant and/or hub to request a match on email or phone to confirm the user is a bank customer/card holder. Each bank also performs user and/or card holder eligibility verification, which can allow to define card holder eligibility and maintain eligibility accuracy in near-real-time. The eligibility takes into account factors including, for example, if the user and/or customer's account is currently active, if the user has adequate credit for the purchase, if the card is active and not on hold, and so forth. The system in FIG. 6 can provide payment and PII provisioning, which allows for sharing of the payment credentials as well as the PII data for the user (e.g., name, address, phone, email).

In some embodiments, the PII and payment data may be stored in each corresponding bank. In some embodiments, the PII and payment data may be stored in the hub. In some embodiments, all of these services (e.g., card holder eligibility verification) and data can be consolidated in the hub. However, in practice, services such as card holder matching and eligibility should be maintained at the banks, which would allow for real time updating if a card is reported as Loss Sensitive Rating Plan (LSRP) or if PII data is changed by the customer and/or user. This can prevent fraudsters from potentially exploiting non-real time systems that would require this data to be synced to the hub. FIG. 7 illustrates a schematic function diagram 700 of a system for provisioning account information of multiple accounts to a transaction data processing system according to an embodiment of the present disclosure. As shown in FIG. 7, individual banks may preferably host the following services: (1) card holder matching—the hub and individual banks will need to use the same email hashing algorithm to allow it to be matched and securely transferred; (2) card holder eligibility—the bank will need to maintain which customers are eligible for provisioning, and this is best done by banks as they have the latest data on LSRP and other event impacting eligibility of cards and account; and (3) payment and PII provisioning—individual banks are responsible for developing and maintaining their own payment sharing API (following design pattern defined by the hub). The card holder matching provides an ability for a partner merchant to request a match on email or phone to confirm a user is a bank customer. The factors for the card holder matching such as speed of response, email hashing, and/or risk score may be considered. The bank may need to maintain a current list of emails of its customers. The card holder eligibility provides an ability to define card holder eligibility and maintain eligibility accuracy in near-real-time. The factors for the card holder eligibility such as speed of response, constant refresh based on LSRP, and/or maintaining eligibility by bank, may be considered. The bank may need to maintain real time card holder eligibility. For the payment and PII provisioning, the hub may standardize the provisioning process so that merchants and/or transaction processors receive the same payment provisioning for all banks. The bank may store payment credentials and/or PII data. The hub provides the following services: card holder authentication. The authentication may include sending SMS OTP, or other MFA, to the customers and/or card holders to authenticate them. This can allow a single SMS OTP from the hub to provide access to all card holders at all banks. The hub provides an ability for a user to request a PIN from the hub. User experience is owned by the merchant and/or transaction processor, and the bank is responsible for delivery and validation of the PIN. The hub can send SMS OTP messages for the multiple banks. The authentication model with the hub as the central authority can be built on a oAuth style authentication model. Once a customer authenticates with the SMS OTP challenge then the hub is authorized to conduct lookups of card holder eligibility and retrieve payment and PII data from the individual banks. This example system uses a hub that allows multiple banks to participate in provisioning their cards in the checkout moment. The hub gives a single point of integration for the merchants. This addresses the fragmented card issuer market where merchants do not want to integrate with multiple banks.

Figure 8:
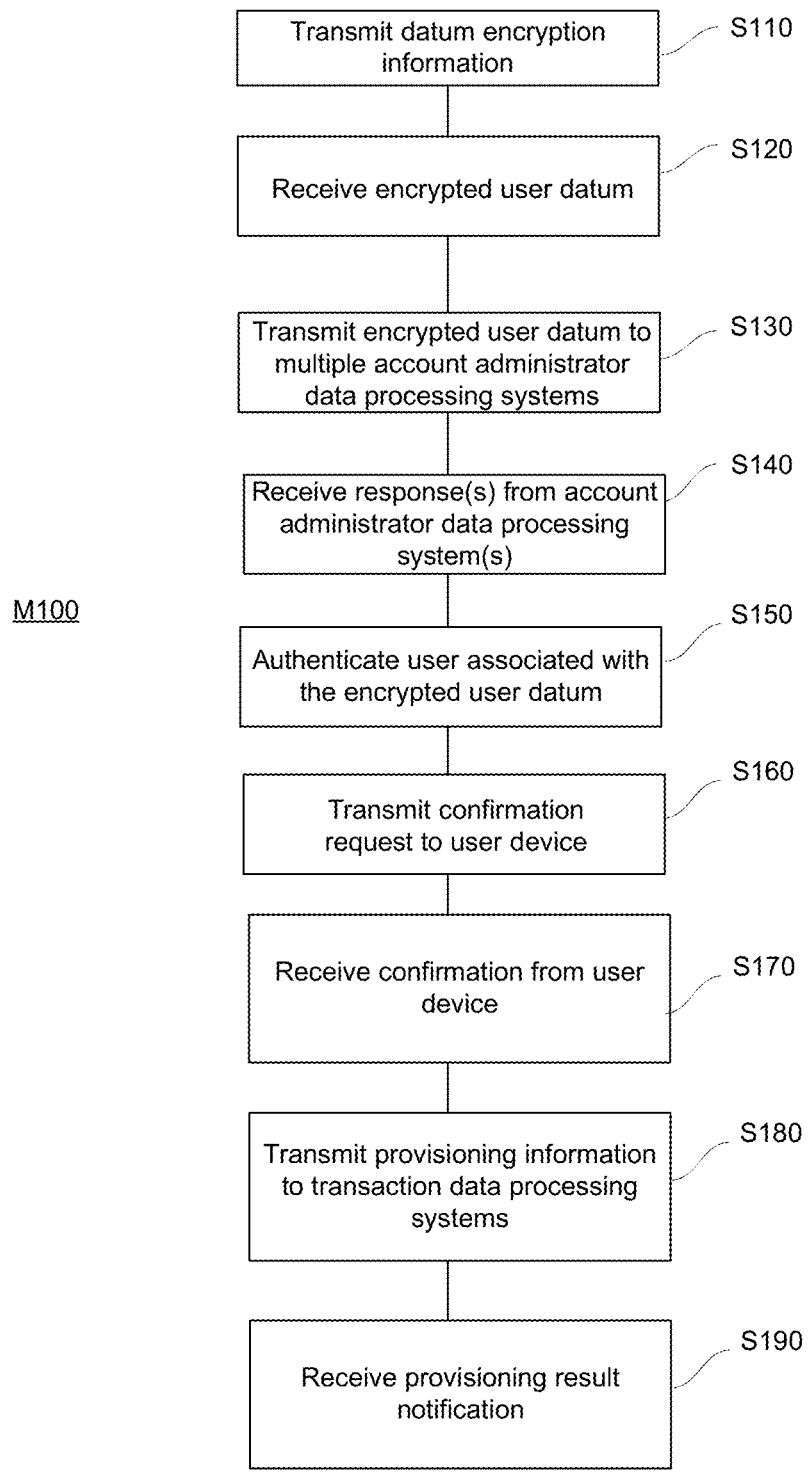
FIG. 8 is a flow diagram illustrating a method of provisioning account information of multiple accounts to a transaction data processing system according to an embodiment of the invention.

FIG. 8 illustrates an exemplary method M100 for providing provisioning information of multiple card accounts associated with a user to a transaction data processing system. The actions of the method M100 may typically be carried out by a hub administrator data processing system such as the central data processing system 140 of the system 100 depicted in FIG. 1. As previously described, the central data processing system 140 may be configured for managing a plurality of partner card account administrators who have card accounts associated with the user, which may be transaction card or other primary accounts. Prior to or as part of the method M100, the central data processing system 140 may generate user datum encryption information adapted for encrypting a particular account holder datum as described above. At S110 of the method M100 the central data processing system 140 may transmit the user datum encryption information to a plurality of account administrator data processing systems associated with card account administrators (e.g., account administrators A, B, C) and a transaction data processing system associated with a transaction administrator (e.g., a merchant). At S120, the central data processing system receives a request to share account provisioning information of multiple card accounts associated with a client user of the transaction data processing system. This request includes an encrypted user datum encrypted using the user datum encryption information. This request may be received from a user device associated with the client user who is using the user device to visit a website of the transaction data processing system for shopping. The request may be transmitted to the central data processing system through the transaction data processing system. At S130, the central data processing system transmits to each of the plurality of account administrator data processing systems, a user account query including the encrypted user datum. At S140, the central data processing system receives from at least one of the plurality of account administrator data processing systems, a response comprising a notification that a user account administrated by that account administrator data processing system is associated with the client user. This response may be a positive response comprising a notification that the client user has a card account administered by that account administrator data processing system. In some embodiments, the central data processing system may also receive a negative response from one or more account administrator data processing systems indicating that the client user does not have a card account administered by that account administrator data processing system. At S150, the central data processing system authenticates the client user using the methods described above. At S160, the central data processing system transmits to the user device through the transaction data processing system a message comprising a request for confirmation that the account provisioning information associated with the at least one of the plurality of account administrator data processing systems should be shared with the transaction data processing system. In some embodiments, the message may include the at least one of the plurality of account administrator data processing systems and/or their associated card account administrators. At S170, the central data processing system receives from the user device through the transaction data processing system a confirmation response including permission to share account provisioning information. In some embodiments, this response may include a selection of particular card account administrators and/or limitations on the provisioning information to be shared. At S180, the central data processing system transmits the account provisioning information to the transaction data processing system. In some embodiments, the account provisioning information may already be stored in the central information database 148 of the central data processing system. In some embodiments, the central data processing system, upon receiving the confirmation from the user device, retrieves or pulls the account provisioning information from the at least one of the plurality of account administrator data processing systems. At S190, the central data processing system may receive a notification from the transaction data processing system indicating that the account provisioning was successfully completed. This may be accomplished, for example, through an API call back. In some embodiments, the notification may alternatively include a negative result indicating that provisioning failed. Such a notification may include information on known or suspected reasons for the failure.

Figure 9:
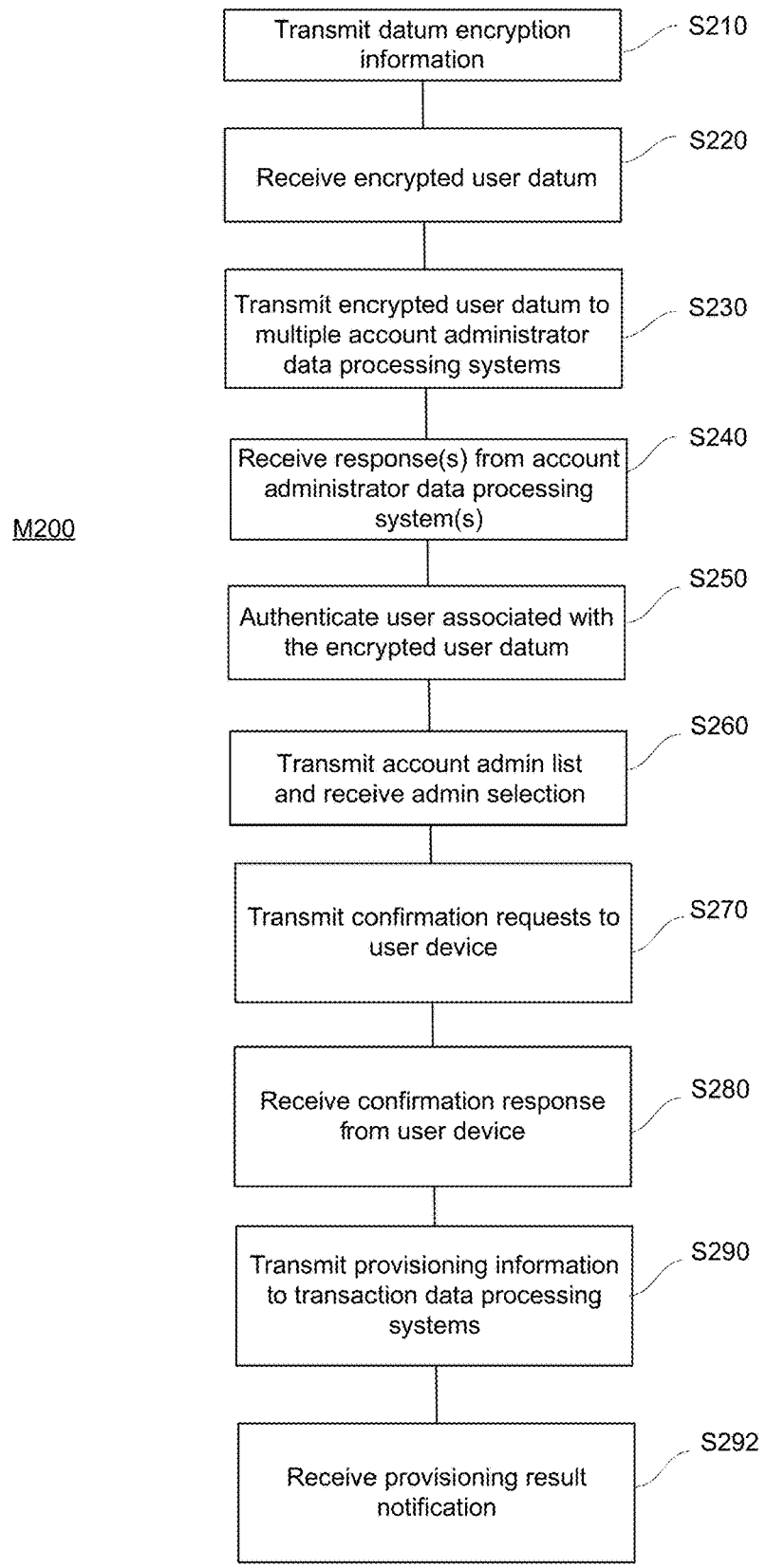
FIG. 9 is a flow diagram illustrating a method of provisioning account information of multiple accounts to a transaction data processing system according to an embodiment of the invention.

FIG. 9 illustrates another exemplary method M200 for providing provisioning information of multiple card accounts associated with a user to a transaction data processing system. As in the previous example, the actions of the method M200 may be carried out by a hub and/or central administrator data processing system such as the central data processing system 140 of the system 100 depicted in FIG. 1. As in the previous method M100, the central data processing system 140 may generate user datum encryption information adapted for encrypting a particular account holder datum as described above. At S210 of the method M200 the central data processing system 140 may transmit the user datum encryption information to a plurality of account administrator data processing systems associated with card account administrators (e.g., account administrators A, B, C) and a transaction data processing system associated with a transaction administrator (e.g., a merchant). At S220, the central data processing system receives a request to share account provisioning information of multiple card accounts associated with a client user of the transaction data processing system. This request includes an encrypted user datum encrypted using the user datum encryption information. This request may be received from a user device associated with the client user who is using the user device to visit a website of the transaction data processing system for shopping. The request may be transmitted to the central data processing system through the transaction data processing system. At S230, the central data processing system transmits to each of the plurality of account administrator data processing systems, a user account query including the encrypted user datum. At S240, the central data processing system receives from at least one of the plurality of account administrator data processing systems, a response comprising a notification that a user account administrated by that account administrator data processing system is associated with the client user. This response may be a positive response comprising a notification that the client user has a card account administered by that account administrator data processing system. In some embodiments, the central data processing system may also receive a negative response from one or more account administrator data processing systems indicating that the client user does not have a card account administered by that account administrator data processing system. At S250, the central data processing system authenticates the client user using the methods described above. At S260, from the query responses, the central data processing system may assemble a list of account administrator data processing systems and/or the corresponding account administrators that have card accounts for the client user. The central data processing system transmits to the transaction data processing system, the account administrator list identifying the at least one of the plurality of account administrator data processing systems. The account administrator list may be displayed on the user device. The user may select one or more account administrators from the account administrator list. Accordingly, the central data processing system receives from the user device through the transaction data processing system, an account administrator selection message including identification of the user-selected account administrator(s) from the account administrator list. At S270, the central data processing system transmits to the user device through the transaction data processing system a message comprising a request for confirmation that the account provisioning information associated with the user-selected account administrator(s) should be shared with the transaction data processing system. In some embodiments, the message may include the user-selected account administrator(s) and their corresponding account administrator data processing systems. At S280, the central data processing system receives from the user device through the transaction data processing system a confirmation response including permission to share account provisioning information. In some embodiments, this response may include a further selection of particular card account administrators and/or limitations on the provisioning information to be shared. If the confirmation response is positive, at S290, the central data processing system transmits the account provisioning information to the transaction data processing system. In some embodiments, the account provisioning information may already be stored in the central information database 148 of the central data processing system. In some embodiments, the central data processing system, upon receiving the confirmation from the user device, retrieves or pulls the account provisioning information from the user-selected account administrator data processing systems. For example, the central data processing system may transmit to the account administrator data processing systems associated with the user-selected account administrator, a provisioning request message including a request for client user account provisioning information, and then receives from the account administrator data processing system associated with the user-selected account administrator, the client user account provisioning information. At S292, the central data processing system may receive a notification from the transaction data processing system indicating that the account provisioning was successfully completed. This may be accomplished, for example, through an API call back. In some embodiments, the notification may alternatively include a negative result indicating that provisioning failed. Such a notification may include information on known or suspected reasons for the failure.

In some embodiments, the account administrator selection message may include at least one client user-supplied authentication credential, and the at least one client user-supplied authentication credential is included in the provisioning request message with the request for client user account provisioning information.

In some embodiments, when the account administrator selection message includes at least one client user-supplied authentication credential, the above methods may further comprise: receiving, by the central data processing system from the account administrator data processing system, client user authentication information; and authenticating the account administrator selection message using the at least one client user-supplied authentication credential and the client user authentication information. The action of transmitting the provisioning request message is carried out only in response to a positive authentication of the account administrator selection message.

In some embodiments, the above methods may further comprise: receiving, by the central data processing system from the account administrator data processing system, client user authentication information; transmitting, by the central data processing system to the transaction data processing system, an authentication request; receiving, by the central data processing system from the transaction data processing system, an authentication response including at least one client user-supplied authentication credential; and authenticating the account administrator selection message by the central data processing system using the at least one client-user-supplied authentication credential and the client user authentication information. The action of transmitting the provisioning request message is carried out only in response to a positive authentication of the account administrator selection message.

In the above methods, the encrypted user datum may include one of a phone number or an email address. The client user account provisioning information may include at least one of a home address, a billing address, a mobile phone number, a home phone number, an Email address, a 16-digit credit card number, a 16-digit virtual card number, or a credit card expiration date. The at least one client user-supplied authentication credential includes a personal identification number (PIN).

In some embodiments, when the client user account provisioning information includes a user device, the above methods may further comprise: transmitting, by the central data processing system to the user device, a message comprising a request for confirmation that the client user account provisioning information should be provisioned to the transaction data processing system; and receiving, by the central data processing system from the user device, a confirmation response including permission to provision to the transaction data processing system the client user account provisioning information. The user device is used by the client user to perform a transaction on a website or in an application associated with the transaction data processing system.

In some embodiments, the above methods may further comprise: transmitting, by the central data processing system to the user device, a notification message indicating whether the client user account provisioning information has been provisioned successfully to the transaction data processing system.

In some embodiments, the plurality of account administrators (e.g., banks) may transmit their hashed user data (e.g., hashed user emails) of their currently eligible customers to the central hub administrator who then stores the hashed user data into a central repository (e.g., the central information database 148). In this scenario, the central data processing system may compare the encrypted user datum received from the transaction data processing system with the hashed user data stored in the central repository to determines which of the plurality of account administrators the user is associated with (e.g., which of the account administrators possess a bank account for the user).

In some embodiments, the criteria for the user and/or the system to select one or more card administrators of which the card account provisioning information will be provisioned may include: the type of the transaction administrator (e.g., a travel website), the number of reward points that can be earned for a card, the frequency of a card being used (e.g., the highest percentage transactions that have been completed for a card by that bank), responding time of banks for the user datum matching, (e.g., within 200 milliseconds, the banks that did respond can be selected and the banks that did not respond can be eliminated), whether a card is in a lock or hold status, and/or the successful possibility of completing transactions (e.g., the fewest rejections that come in from that bank and the highest possibility of completing that transaction).

In some embodiments, the plurality of account administrators (e.g., banks) may transmit the card account provisioning information of their currently eligible customers to the central hub administrator who then stores the card account provisioning information into a central repository (e.g., the central information database 148). In this scenario, the central data processing system may not need to request the card account provisioning information from the user-selected one or more account administrators. The central data processing system can directly retrieve the card account provisioning information stored in the central repository and transmit the card account provisioning information to the transaction data processing system. Optionally, the card account provisioning information may be purged and/or removed from the central repository after a certain period of time (e.g., one week) for data security reasons.

The present disclosure provides automated methods by which multiple card account administrators (e.g., banks) can securely push account provisioning information and user data to a transaction administrator (e.g., merchants) without the need for the account holder and the transaction administrator to repeatedly switch applications, authenticate, or log into the processing systems for the different card administrator entities. In some examples, this can be accomplished through the use of a shared encryption and/or hashing algorithm and/or unique encryption keys, which allows the primary card account administrators and partner transaction administrator entities to identify account holders they have in common without sharing account information. This can establish the basis for secure transmission of primary account provisioning information for a particular primary account holder from the multiple primary account administrators to those partner transaction administrator entities also having an account for that primary account holder or with which that primary account holder wishes to set up an account. By doing so, the security and efficiency of the sharing operation as well as convenience to the account holder can be greatly improved.

In some examples, the present disclosure can use a central hub administrator to pull card holder account information from multiple banks and/or wallets and pushing this information to a partner merchant, which can allow the merchant to easily integrate with multiple banks simultaneously. In some examples, the present disclosure provides the banks and the partner merchant with a hashing algorithm that can allow each to construct and store a hash of one or more pieces of common information (e.g., a phone number or email address) for each of its customer accounts. Upon receiving a hashed datum of information of the card holder (e.g., encrypted using the hash algorithm from the partner merchant), the hub system transmit this data to all of the banks, each of which can compare the hashed datum with the stored hashes for its own customers. If the hash for one of its own customers matches, the bank can return an indication that the card holder has an account with that bank. The hub system can then authenticate the card holder and send a confirmation request to the card holder. Upon authenticating the card holder and receiving a confirmation that the card holder approves sharing account information from one or more of the responding banks with the partner merchant, the hub system can pull the account information from one or more of the responding banks and transmit the card holder account information to the partner merchant.

In some examples, the present disclosure provides for pushing card account information of multiple banks to a merchant with high security and minimal effort and information entry by the merchant. This can enable a customer to easily access to their PII data and payment credentials from all their banks during checkout on a website or application of the merchant. Example embodiments of the present disclosure can use a hub system that allows multiple banks to participate in provisioning their cards in the checkout moment. The hub can provide a single point of integration for the merchants, which can address the fragmented issuer market where merchants don't want to integrate with multiple banks. Accordingly, automated systems and methods of the present disclosure can be a significant improvement to existing approaches to account provisioning, which can only allow the merchant to integrate with one bank at a time.

The automated systems and methods described herein may be tangibly embodied in one or more non-transitory, computer readable medium (e.g., physical media), such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

It will be readily understood by those persons skilled in the art that the present disclosure is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for providing provisioning information to a transaction data processing system, the method comprising:

transmitting, by a central data processing system to a plurality of account administrator data processing systems and the transaction data processing system, user datum encryption information;

receiving, by the central data processing system from the transaction data processing system, an encrypted user datum associated with a client user of the transaction data processing system;

transmitting, by the central data processing system to each of the plurality of account administrator data processing systems, a user account query including the encrypted user datum;

receiving, by the central data processing system from at least one of the plurality of account administrator data processing systems, a response comprising a notification that a user account administrated by that account administrator data processing system is associated with the client user;

transmitting, by the central data processing system to the transaction data processing system, an account administrator list identifying the at least one of the plurality of account administrator data processing systems;

receiving, by the central data processing system from the transaction data processing system, an account administrator selection message including identification of a user-selected account administrator from the account administrator list;

receiving, by the central data processing system from the account administrator data processing system associated with the user-selected account administrator, client user authentication information;

transmitting, by the central data processing system to the transaction data processing system, an authentication request;

receiving, by the central data processing system from the transaction data processing system, an authentication response including at least one client user-supplied authentication credential;

authenticating, by the central data processing system, the account administrator selection message using the at least one client-user-supplied authentication credential and the client user authentication information;

transmitting, by the central data processing system to the account administrator data processing system associated with the user-selected account administrator, a provisioning request message including a request for client user account provisioning information, wherein the action of transmitting the provisioning request message is carried out only in response to a positive authentication of the account administrator selection message;

receiving, by the central data processing system from the account administrator data processing system associated with the user-selected account administrator, the client user account provisioning information; and transmitting, by the central data processing system to the transaction data processing system, the client user account provisioning information.

2. The method according to claim 1, wherein:

the account administrator selection message includes at least one client user-supplied authentication credential, and the at least one client user-supplied authentication credential is included in the provisioning request message with the request for client user account provisioning information.

3. The method according to claim 1, wherein the encrypted user datum includes one of a phone number or an email address.

4. The method according to claim 1, wherein the at least one client user-supplied authentication credential includes a personal identification number (PIN).

5. The method according to claim 1, wherein the client user account provisioning information includes a user device, and the method further comprises:

transmitting, by the central data processing system to the user device, a message comprising a request for confirmation that the client user account provisioning information should be provisioned to the transaction data processing system, and receiving, by the central data processing system from the user device, a confirmation response including permission to provision to the transaction data processing system the client user account provisioning information.

6. The method according to claim 5, wherein the user device is used by the client user to perform a transaction on a website or in an application associated with the transaction data processing system.

7. The method according to claim 1, further comprising:

receiving, by the central data processing system from the transaction data processing system, a message indicating whether the client user account provisioning information has been provisioned successfully to the transaction data processing system.

8. An automated system for providing provisioning information to a transaction data processing system, the system comprising:

a datum encryption processor configured to:

generate user datum encryption information, and transmit the user datum encryption information to a plurality of account administrator data processing systems and the transaction data processing system;

a user account identification data processor configured to:

receive, over a first network from the transaction data processing system, an encrypted user datum associated with a client user of the transaction data processing system, transmit, over a second network to each of the plurality of account administrator data processing systems, a user account query including the encrypted user datum, receive, over the second network from at least one of the plurality of account administrator data processing systems, a response comprising a notification that a user account administrated by that account administrator data processing system is associated with the client user, transmit, over the first network to the transaction data processing system, an account administrator list identifying the at least one of the plurality of account administrator data processing systems, receive, over the first network from the transaction data processing system, an account administrator selection message including identification of a user-selected account administrator from the account administrator list, receive, over the second network from the account administrator data processing system associated with the user-selected account administrator, client user authentication information, transmit, over the first network to the transaction data processing system, an authentication request, receive, over the first network, from the transaction data processing system, an authentication response including at least one client user-supplied authentication credential, and authenticate the account administrator selection message using the at least one client-user-supplied authentication credential and the client user authentication information; and a provisioning information broadcast data processor configured to:

transmit, over the second network to the account administrator data processing system associated with the user-selected account administrator, a provisioning request message including a request for client user account provisioning information, wherein the action of transmitting the provisioning request message is carried out only in response to a positive authentication of the account administrator selection message, receive, over the second network from the account administrator data processing system associated with the user-selected account administrator, the client user account provisioning information, and transmit, over the first network to the transaction data processing system, the client user account provisioning information.

9. The system according to claim 8, wherein:

the account administrator selection message includes at least one client user-supplied authentication credential, and the at least one client user-supplied authentication credential is included in the provisioning request message with the request for client user account provisioning information.

10. The system according to claim 8, wherein the encrypted user datum includes one of a phone number or an email address.

11. The system according to claim 8, wherein the client user account provisioning information includes at least one of a home address, a billing address, a mobile phone number, a home phone number, an Email address, a 16-digit credit card number, a 16-digit virtual card number, or a credit card expiration date.

12. The system according to claim 8, wherein the at least one client user-supplied authentication credential includes a personal identification number (PIN).

13. The system according to claim 8, wherein the client user account provisioning information includes a user device, and the system further comprises a user confirmation data processor configured to:
    transmit, over a third network to the user device, a message comprising a request for confirmation that the client user account provisioning information should be provisioned to the transaction data processing system, and
    receive, over the third network from the user device, a confirmation response including permission to provision to the transaction data processing system the client user account provisioning information.

14. The system according to claim 13, wherein the user confirmation data processor configured to receive, over the first network from the transaction data processing system, a message indicating whether the client user account provisioning information has been provisioned successfully to the transaction data processing system.

15. A non-transitory, computer readable medium comprising instructions that, when executed on a data processing system, perform actions comprising:
    transmitting, by a central data processing system to a plurality of account administrator data processing systems and a transaction data processing system, user datum encryption information;
    receiving, by the central data processing system from the transaction data processing system, an encrypted user datum associated with a client user of the transaction data processing system;
    transmitting, by the central data processing system to each of the plurality of account administrator data processing systems, a user account query including the encrypted user datum;
    receiving, by the central data processing system from at least one of the plurality of account administrator data processing systems, a response comprising a notification that a user account administrated by that account administrator data processing system is associated with the client user;
    transmitting, by the central data processing system to the transaction data processing system, an account administrator list identifying the at least one of the plurality of account administrator data processing systems;
    receiving, by the central data processing system from the transaction data processing system, an account administrator selection message including identification of a user-selected account administrator from the account administrator list;
    receiving, by the central data processing system from the account administrator data processing system associated with the user-selected account administrator, client user authentication information;
    transmitting, by the central data processing system to the transaction data processing system, an authentication request;
    receiving, by the central data processing system from the transaction data processing system, an authentication response including at least one client user-supplied authentication credential;
    authenticating, by the central data processing system, the account administrator selection message using the at least one client-user-supplied authentication credential and the client user authentication information;
    transmitting, by the central data processing system to the account administrator data processing system associated with the user-selected account administrator, a provisioning request message including a request for client user account provisioning information, wherein the action of transmitting the provisioning request message is carried out only in response to a positive authentication of the account administrator selection message;
    receiving, by the central data processing system from the account administrator data processing system associated with the user-selected account administrator, the client user account provisioning information; and
    transmitting, by the central data processing system to the transaction data processing system, the client user account provisioning information.

16. The system according to claim 13, wherein the user device is used by the client user to perform a transaction on a website or in an application associated with the transaction data processing system.

17. The non-transitory, computer readable medium of claim 15, wherein the client user account provisioning information includes at least one of a home address, a billing address, a mobile phone number, a home phone number, an Email address, a 16-digit credit card number, a 16-digit virtual card number, or a credit card expiration date.

18. The non-transitory, computer readable medium of claim 15, wherein:
    the account administrator selection message includes at least one client user-supplied authentication credential, and
    the at least one client user-supplied authentication credential is included in the provisioning request message with the request for client user account provisioning information.

19. The non-transitory, computer readable medium of claim 15, wherein the actions further comprise receiving, by the central data processing system from the transaction data processing system, a message indicating whether the client user account provisioning information has been provisioned successfully to the transaction data processing system.

20. The non-transitory, computer readable medium of claim 15, wherein the encrypted user datum includes one of a phone number or an email address.

* * * * *